W. O. MILLER.
TRANSMISSION MECHANISM.
APPLICATION FILED MAY 27, 1918.
1,304,346.
Patented May 20, 1919.
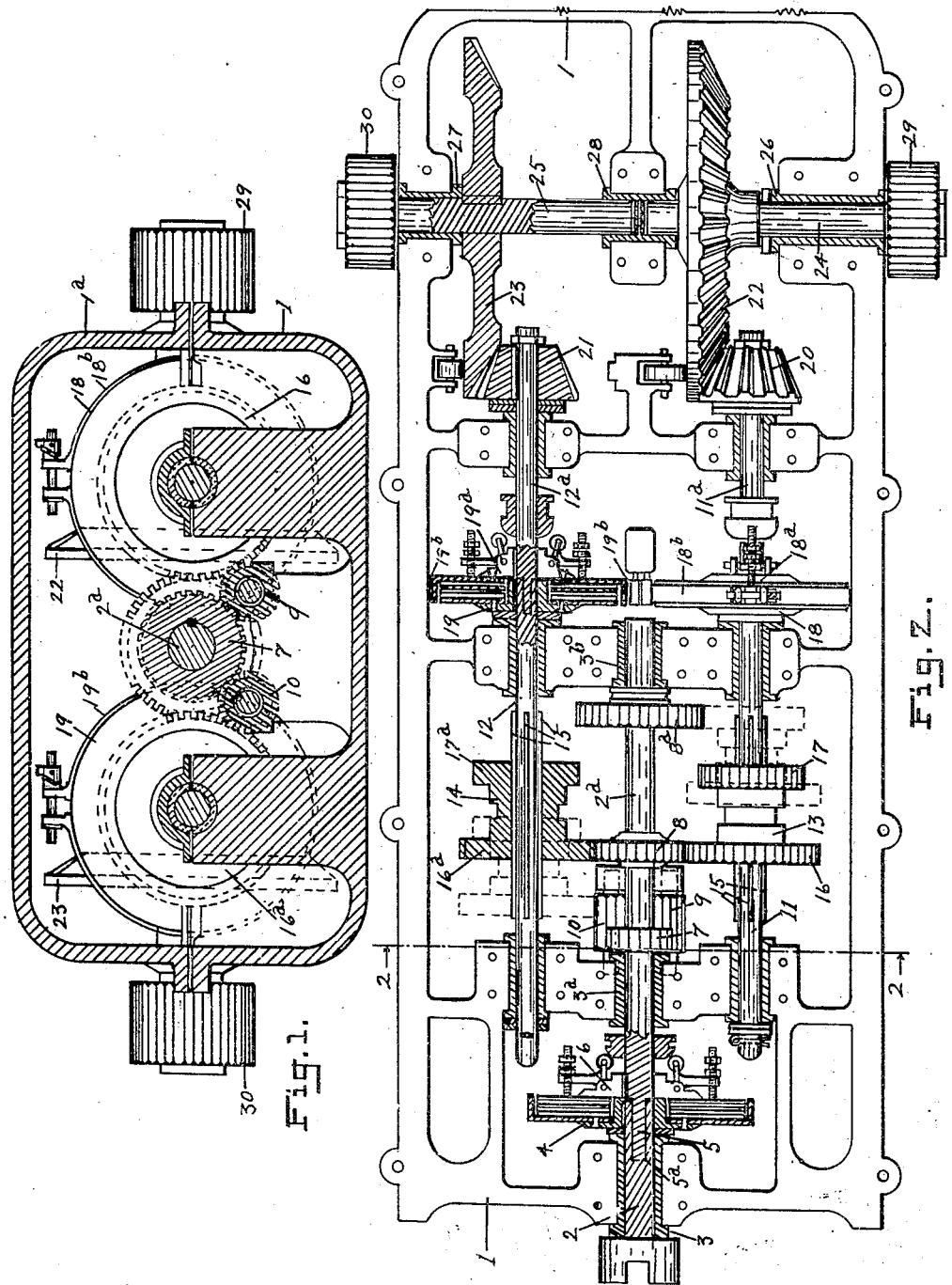
WITNESSES
O. M. Vrooman
Stanley Miller
INVENTOR
William O. Miller
By F. G. Bates
HIS ATTORNEY.

UNITED STATES PATENT OFFICE.

WILLIAM O. MILLER, OF SAN JOSE, CALIFORNIA.

TRANSMISSION MECHANISM.

1,304,346.  Specification of Letters Patent.  Patented May 20, 1919.

Application filed May 27, 1918. Serial No. 236,896.

*To all whom it may concern:*

Be it known that I, WILLIAM O. MILLER, a citizen of the United States, residing at San Jose, in the county of Santa Clara and State of California, have invented a new and useful Improvement in Transmission Mechanism, of which the following is a specification.

This invention relates to improvement in transmission mechanism and more particularly to that class of transmission mechanism used in tractors and the like, and the objects of my invention are:

First: To provide a transmission mechanism that will have two driven shafts independent of each other and a driving shaft independent of the engine when desired, and one in which either shaft may be rendered inoperative by manually disengaging the gears or releasing a clutch, independent of the other shaft.

Second: To provide a transmission mechanism that will permit the reversal of one driven shaft at a time, or of both driven shafts at once, or one shaft reversed and the other shaft driven forward at the speed selected, or both shafts driven forward at different speeds or the same speed as desired.

Third: To provide a transmission mechanism for tractors and the like that will transmit the full power to both traction members when turning corners and one in which all moving parts run in a bath of oil needing no lubrication from the outside.

A further object is to generally improve this class of transmission mechanism so as to increase their usefulness, durability and efficiency.

With these and other objects in view, the invention resides in the novel arrangement of parts as hereinafter fully described and claimed, it being understood that various changes in form proportion and minor details of construction may be resorted to within the scope of the appended claims.

Reference is to be had to the accompanying drawings, forming a part of this specification, in which similar reference characters indicate corresponding parts in all the views.

Figure 1 is an enlarged sectional view as shown on line 2—2 of Fig. 2.

Fig. 2 is a plan view of my transmission mechanism, top cover removed, part in section.

My transmission mechanism forming the subject matter of the present invention, comprises an oil tight casing 1 and top cover 1ª; a drive shaft is shown at 2 journaled in a suitable bearing 3 in the casing 1; a clutch member is shown at 4 and is keyed to shaft 2. A shaft is shown at 2ª journaled in suitable bearings 3ª and 3ᵇ; a pintle on the end of this shaft is shown at 5, adapted to engage a socket in shaft 2 at 5ª; a coacting clutch member, manually operated, is shown at 6 and is keyed to shaft 2ª, adapted to frictionally engage the clutch member 4 thereby binding the shafts 2 and 2ª together when desired, clutch operative means not shown. A plurality of driving spur gears of different diameters are shown at 7, 8 and 8ª which are keyed rigid to shaft 2ª. Two pinion gears are shown at 9 and 10 journaled on suitable bearings below the shaft 2ª and meshing with spur gear 7.

Positioned one on each side of the shaft 2ª, and journaled in suitable bearings, are shown the driven shafts 11 and 12, having the sliding gear members 13 and 14 mounted thereon and held against rotating on said shafts by means of a plurality of keys 15. The sliding gears 13 and 14 are manually operated by any suitable gear shifting mechanism, not shown. The sliding gear members each have a spur gear 16 and 16ª, adapted to mesh with spur gear 8 or pinion gears 9 or 10, as desired and a second spur gear 17 and 17ª of a less diameter, adapted to mesh with spur gear 8ª when desired.

At one end of each of the driven shafts 11 and 12 and rigidly keyed thereon are shown the clutch members 18 and 19. These shafts 11 and 12 each have an extension shaft 11ª and 12ª having pintles engaging sockets in the ends of shafts 11 and 12, adapted to hold said shafts in alinement. Coacting clutch members manually operated are shown at 18ª and 19ª keyed to shafts 11ª and 12ª, operative means not shown. The clutch members 18ª and 19ª are each provided with a manually operated brake band 18ᵇ and 19ᵇ, operative means not shown. Bevel pinion gears are shown at 20 and 21, adapted to engage bevel gears 22 and 23. These gears 22 and 23 are keyed to shafts 24 and 25 journaled in suitable bearings 26 and 27 in the casing 1 and the central bearing 28. At the outer end of the shafts 24 and 25 are shown pinion gears 29 and 30 rigidly keyed to the shafts 24 and 25 respectively. I show pinion gears in the drawings for illustration but sprocket wheels or ground wheels may be attached to the shafts 24 and 25 as desired.

The operation of my transmission mechanism is as follows:

The shaft 2 being revolved by any suitable power, the clutch member 6, in engagement with clutch member 4, causes the shaft $2^a$ and its gears 7, 8 and $8^a$ to revolve. The gears 16 and $16^a$ being shown in mesh with driving gear 8 will cause the driven shafts to revolve at, in this instance, low speed, but by sliding the gears 16 and $16^a$ out of mesh with gear 8 and bringing gears 17 and $17^a$ into mesh with driving gear $8^a$, sliding gear member 13 being shown in this position in dotted lines, the driven shafts will revolve in the same direction but at greater speed, and by leaving gear 16 in mesh with gear 8 and by disengaging gear $16^a$ with gear 8 and moving sliding gear member 14 until gear $17^a$ meshes with driving gear $8^a$, both driven shafts will revolve in the same direction but at different speeds. This operation may be performed on either driven shaft. To reverse the rotation of either driven shaft or both driven shafts at once the gears 16 and $16^a$ as desired are slid out of engagement with gear 8 and brought into engagement with the pinion gears 9 or 10, as selected, sliding gear member 14 being shown in this position in dotted lines. To release the driven shafts from rotating, the sliding gear members 13 and 14 are brought to a position between the driving gears 8 and $8^a$ thereby disengaging the driven gears from the driving gears. The rotation of the bevel pinion gears 20 and 21 and the coacting members may be governed by means of the clutch members 18 and 19, and the coacting clutch members $18^a$ and $19^a$ and brake bands $18^b$ and $19^b$ clutch and brake operative means not shown.

Having thus described my invention, what I claim as new and desire to secure by Letters Patent is:

1. In a transmission mechanism of the class described; a casing having a removable top cover bolted thereon, forming an oil tight gear case; a driving shaft, centrally positioned within the casing and extending part way through the casing, longitudinally and rotatively mounted therein, said shaft being provided with a clutch positioned within the casing; a plurality of driving gears keyed to said driving shaft and spaced apart; a driven pinion gear rotatively mounted below and a distance to one side of the driving shaft; a second driven pinion gear rotatively mounted below and a distance to the other side of the driving shaft, said pinion gears meshing with one of the driving gears; a driven shaft rotatively mounted at one side of and parallel to the driving shaft; a second driven shaft rotatively mounted at the other side of the driving shaft and parallel therewith, each of these shafts being provided with multiple gear members slidably mounted thereon, adapted to be manually operated whereby the sliding gear members may be brought into engagement with either of the driving gears or the pinion gears as selected, and having bevel pinion gears mounted at one end of each driven shaft; clutches positioned on each driven shaft between the sliding gear members and the bevel pinion gears, each clutch being provided with a manually operated brake band, substantially as shown and described.

2. In a transmission mechanism of the class described, the combination of a driving shaft rotatively mounted in a suitable gear case, said driving shaft being provided with a releasing clutch positioned within said casing and a plurality of spur gears securely keyed to said shaft, the rotation of said shaft and gears being manually controlled by means of said clutch; two reverse pinion gears rotatively mounted a distance below and one on each side of the driving shaft and meshing with one of the gears on said driving shaft; two driven shafts rotatively mounted in the same plane, parallel with and one on each side of the driving shaft, said driven shafts each being provided with manually operated sliding gear members and clutches, the sliding gear members being adapted to be brought into engagement with the spur gears on the driving shaft as selected or into engagement with the reverse pinion gears, as selected, each driven shaft being provided with a manually operated brake band adapted to hold the working end of either driven shaft from revolving when desired, substantially as shown and described.

3. In a transmission mechanism, a driving shaft rotatively mounted in a suitable gear case, said driving shaft being provided with a plurality of spur gears keyed thereon, and a manually operated releasing clutch positioned within the casing whereby the rotation of the spur gears may be manually controlled; two reverse pinion gears rotatively mounted below and one on each side of the driving shaft and meshing with one of the driven spur gears, two driven shafts rotatively mounted in the casing parallel with and in the same plane as the driving shaft; multiple sliding gear members, slidably mounted on each of the driven shafts, each sliding gear member being adapted to be independently brought into mesh with the driving spur gears or the reverse pinion gears as selected whereby either driven shaft may be caused to revolve forward at the speed selected or reversed independent of the other driven shaft, or one driven shaft driven ahead at one speed and the other driven shaft driven ahead at a different speed, each of these driven shafts having bevel pinion gears keyed to the end and a clutch positioned between the bevel gears and the sliding gear members, each clutch being provided with a manually operated brake band whereby either bevel pinion gear may be released from rotating and held against rotating by means of said brake band substantially as and for the purpose set forth.

In testimony whereof I affix my signature in the presence of two subscribing witnesses, this 22 day of May, 1918.

WILLIAM O. MILLER.

Witnesses:
  GEO. B. WHITNEY,
  O. N. VROOMAN.